M. A. CUMING.
Machine for Pressing Hats.
No. 167,506. Patented Sept. 7, 1875.
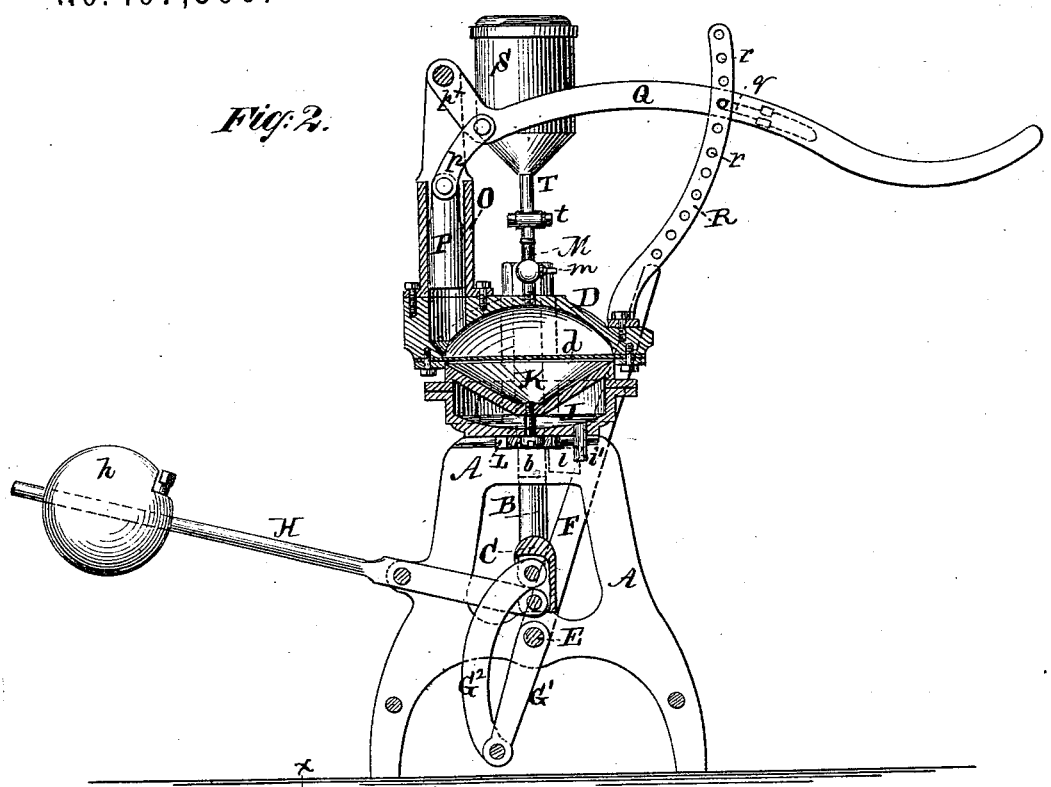
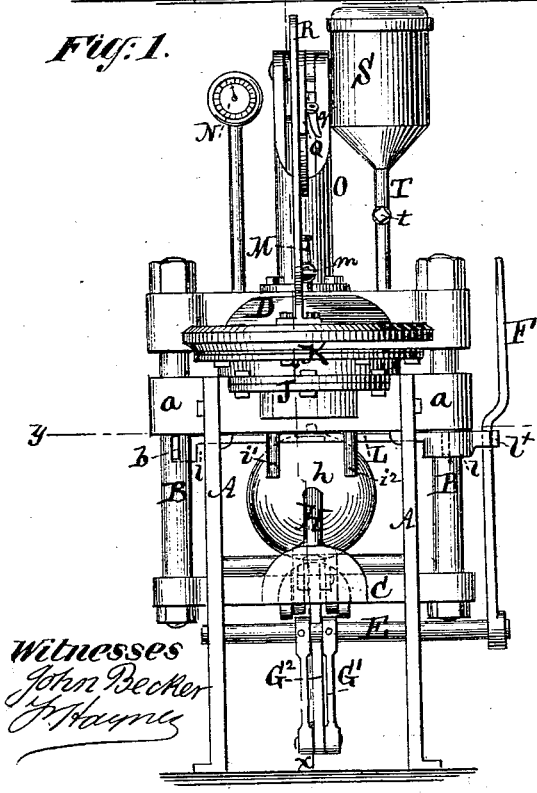
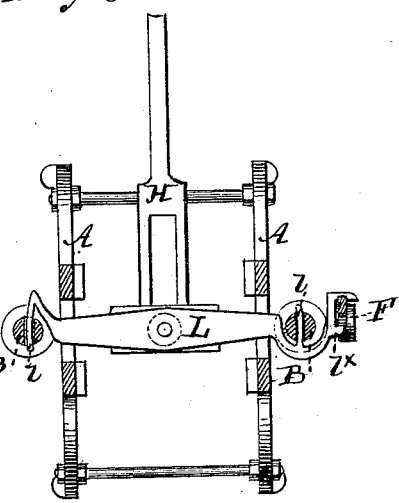
Witnesses
John Becker
H. Haynes
M. A. Cuming
by his Attorneys
Brown & Allen

UNITED STATES PATENT OFFICE.

MARI A. CUMING, OF NEW YORK, N. Y.

IMPROVEMENT IN MACHINES FOR PRESSING HATS.

Specification forming part of Letters Patent No. 167,506, dated September 7, 1875; application filed July 13, 1875.

*To all whom it may concern:*

Be it known that I, MARI A. CUMING, of New York, in the county and State of New York, have invented a new and Improved Hydraulic Press for Hats; and I do hereby declare that the following is a full, clear, and exact description of the same, reference being had to the accompanying drawing, which forms part of this specification.

My invention relates to machines for pressing hats by the pressure of water on a flexible diaphragm; and it consists in a novel construction, arrangement, and combination of mechanism for raising and lowering the dome, and for locking it in place when lowered to its seat.

In the accompanying drawing, Figure 1 is a side or end view of a machine constructed according to my invention. Fig. 2 is a vertical section taken in the line $x\,x$ of Fig. 1. Fig. 3 is a horizontal section taken in the line $y\,y$ of Fig. 1.

A represents a stand or frame-work of any suitable construction, upon which the working parts are supported. In the upper part of the frame A are two lugs, $a\,a$, opposite each other, which form bearings for two sliding rods, B B. The lower ends of these rods are attached to the ends of a cross-head, C, by means of screw-threads and nuts, or in any other suitable manner. The upper ends of the rods are attached to the dome D in a similar manner to that in which the lower ends are attached to the cross-head, or in any other suitable manner. Immediately under the cross-head C is a rock-shaft, E, having its bearings in the frame A, and provided with a handle or lever, F, for operating it. A slotted or forked arm, $G^1$, has its inner end rigidly attached to the rock-shaft E about midway between the bearings of said shaft, and in a direction about opposite to that of the handle or lever F. To the outer end of the arm $G^1$ is pivoted the lower end of a curved bar or link, $G^2$, the upper end of which is pivoted to the under side of the cross-head C. By this arrangement the handle F, rock-shaft E, and arm $G^1$, combined, operate as a lever of the first order, with the rock-shaft for the fulcrum, and the link or bar $G^2$ and arm $G^1$, combined, operate as a toggle-joint, so that when the handle or lever F is depressed the dome D is elevated by the operation of the arms $G^1$ $G^2$ upon the cross-head C, which is connected to said dome by the rods B B, as before described; and when the handle or lever F is raised the dome D is lowered by the operation of said arm $G^1$ and link $G^2$, which two parts operate as a toggle-joint in both the ascending and descending movements. To the cross-head C is pivoted the inner end of a lever, H, having its fulcrum in the frame A, and its outer end provided with a counterbalance-weight, $h$, by which means the raising and lowering of the dome is facilitated. The mold K is arranged in the upper part of the frame A, resting upon or over a chamber, J, provided with inlet and outlet pipes $i^1$ $i^2$, by means of which the mold is heated by steam or hot water. The mold K may serve as a die for giving the external form to the bat or cone, or it may serve as a seat for a block receiving the bat or cone, and giving the internal form thereto. On the under side of the chamber J a bar, L, is pivoted about midway of its length, so as to oscillate in a horizontal plane. Near the ends of the bar L are two tapering lips or tongues, projecting laterally in opposite directions. In the rods B B are slots $b\,b$, corresponding in size, shape, and direction with the lips $l\,l$, and occupying positions below the lugs $a\,a$ when the dome D is in its lowest position. In the end of the bar L, toward the handle or lever F, is a notch or fork, $l^\times$, formed for engagement with said handle, and having one of its branches shorter than the other, and inclined or beveled to facilitate such engagement.

When the dome D is in its lowest position, resting on the mold K, and the handle or lever F is in a vertical position and engaged with the notch or fork $l^\times$, the lips $l\,l$ are in the slots $b\,b$, under the lugs $a\,a$, and serve to keep the dome locked in contact with its seat upon the mold. When the lever is depressed to raise the dome, at the commencement of its movement it oscillates the bar L, so as to withdraw the lips $l$ from the slots $b$, and leave the dome free to be raised by the continuation of the movement of the lever, as before described. When the lever is raised to lower the dome, as it reaches the end of the bar L it slides over the beveled or inclined portion, and engages with the notch or fork $l^\times$, so as to oscillate the bar and move it to its former position, forcing the lips $l\ l$ into the slots $b\ b$, as before, and thus locking the dome in position.

The dome D is of approximate hemispherical interior form, and is provided with a flexible diaphragm, $d$, similar to those heretofore in use. The dome is also provided with a tube, M, and valve $m$, for supplying it with water, and with a gage, N, for determining the pressure thereof. On the top of the dome is a cylinder, O, in which works a close-fitting piston or plunger, P, connected, by a link, $p$, with a handle or lever, Q, provided with a spring-dog, $q$, arranged to engage with holes $r$ in an arm, R, attached to the dome, for the purpose of holding the handle in different positions. The handle or lever Q has its fulcrum immediately over the plunger P, and is bent into an elbow, $p^\times$, at the point where the link $p$ joins it, so as to form, with said link, a toggle-joint. Above the dome is a reservoir, S, communicating with and attached to said dome by a pipe, T, provided with a valve, $t$.

The work is placed in the mold K, and the dome D is lowered and locked in place in its seat, with the plunger P in its highest position, water having been introduced into the dome D through the pipe M, or from the reservoir S, or first through the pipe M, and afterward from the reservoir, until the weight of the water ceases to exert further pressure upon the diaphragm $d$, and the valves $m$ and $t$ are then closed. The plunger B is then forced downward by means of the handle or lever Q, so as to compress the water in the dome and expand the diaphragm until it is in contact with every part of the surface of the work and presses the same closely and uniformly against the mold. When the desired amount of pressure is obtained the lever Q may be locked in position, and so held as long as desired, by allowing the spring-dog $q$ to engage with one of the holes $r$ in the lever R. When the machine is closed, the contact of the dome with its seat produces an initiatory pressure sufficient to distend the diaphragm to its full extent before the plunger P is brought into use, after which said plunger is depressed, as before described.

What I claim as new, and desire to secure by Letters Patent, is—

1. The combination, with the dome D, of the sliding rods B B, cross-head C, curved link $G^2$, arm $G^1$, rock-shaft E, and lever F, arranged and operating as herein shown and described, for the purpose specified.

2. The combination, with the lugs $a$ in the frame A and the rods B, provided with slots $b$, of the pivoted bar L, provided with the tongues $l\ l$ and notch or fork $l^\times$, and the lever F, for locking the dome in place on its seat, substantially as herein described.

3. In a hydraulic press for hats, the combination, with the dome D and cylinder O, of the plunger P, the connecting-link $p$, and the lever Q, formed with the elbow $p^\times$, and provided with the locking device $q\ r$ R, as herein shown and described.

M. A. CUMING.

Witnesses:
BENJAMIN W. HOFFMAN,
FRED. HAYNES.